G. F. STONE.
Improvement in Wash-Boilers.

No. 131,638.  Patented Sep. 24, 1872.

Witnesses:
J. West Wagner
Phil. A. Larner

Inventor:
George F. Stone
by
Johnson, Klaucke & Co.
Attorneys

UNITED STATES PATENT OFFICE.

GEORGE F. STONE, OF BALTIMORE, MARYLAND.

IMPROVEMENT IN WASH-BOILERS.

Specification forming part of Letters Patent No. 131,638, dated September 24, 1872.

*To all whom it may concern:*

Be it known that I, GEORGE F. STONE, of the city and county of Baltimore, in the State of Maryland, have invented a new and useful Improvement in Wash and other Boilers; and I do hereby declare the following to be a full, clear, and exact description of the same, reference being had to the accompanying drawing making a part of this specification, and in which—

Figure 1:
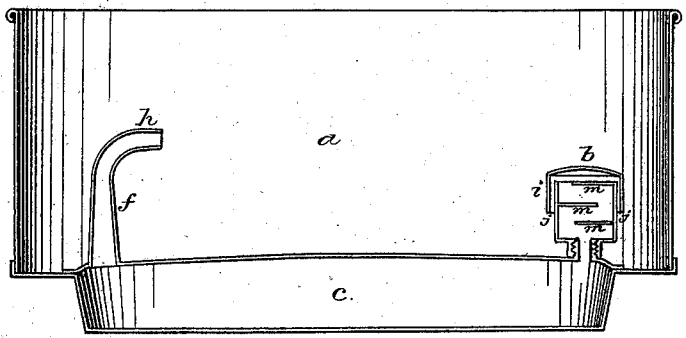
Figure 2:
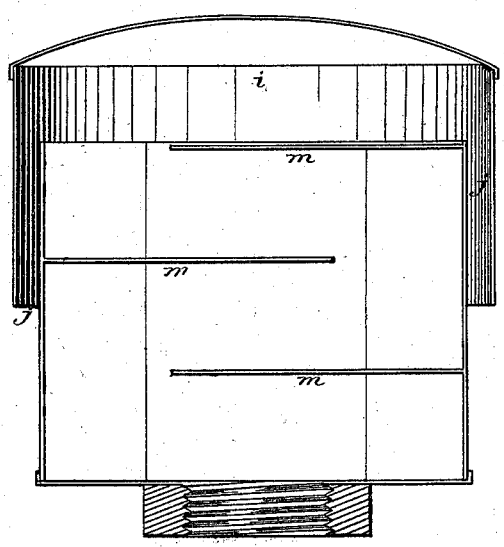
Figure 3:
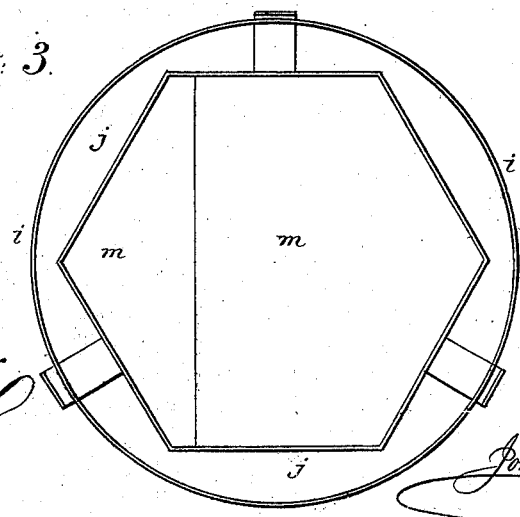

Figure 1 represents a vertical longitudinal section of a boiler with my improved back-water stop applied thereto; Fig. 2 represents a vertical cross-section of my improved back-water stop detached and on an enlarged scale; and Fig. 3 is a horizontal cross-section of the same.

My invention relates to that class of wash-boilers in which the water enters a trap placed at any suitable position of the bottom of the boiler, and is thereby conducted to a chamber upon or beneath the bottom of the boiler, or through pipes passing through the same and opening into the boiler either at one or both ends of the latter, at suitable point or points near its top; the design of which arrangement is to cause the water in the boiler to flow in continuous circuit or circuits through the trap and chamber or pipes, but which result has not hitherto been accomplished without the objection and difficulty of the back-action of the water.

It is the object of my invention to overcome the difficulties above mentioned, which I accomplish by means of fixed stops or partial partitions arranged within a chamber having inlet and outlet openings in a way to admit of the continuous free flow of water through said chamber to and within the boiler without, in the least degree, interrupting the continuity of the circuit of the hot water.

In the accompanying drawing, $a$ is the boiler, and $b$ the trap or back-water stop, while $c$ is the heating-chamber, in the instance shown formed under the bottom of the boiler. $f$ is a vertical pipe at one end of the boiler, having its upper extremity bent, as shown at $h$, so as to discharge water into the boiler. The trap $b$ consists of a chamber of any suitable shape, to the outside of which is secured a flaring guard, $i$, leaving inlet-openings $j$, which guard prevents the clothes from clogging the holes in the walls of the trap, through which water finds its way to the interior thereof. Within the outer shell of the trap, and at a suitable distance from each other and secured to alternate sides, are partial partitions $m$, which may be either parallel or at an angle to the top and bottom of the shell. These partitions are so arranged that, while presenting no manner of obstacle to the passage of water from the outside through the trap, they effectually prevent it from passing back from inside to outside under the pressure of the steam except through the proper channel, the pipe $f$. As the water is heated in the chamber $c$ steam is generated, which has a tendency to force the water out through pipe $f$, and would also force it out through the trap but for the partial partitions $m$.

In certain kinds of boilers—for instance, boilers permanently secured to the rear of cook-stoves, in which the pipe connecting the trap to the boiler enters the latter at the end—I place the trap horizontally, so that the partitions $m$ are vertical, extending from each side of the trap, which arrangement is equally effective.

In the present instance I have shown a boiler having but one pipe, $f$, at one end of the same, the trap being at the opposite end; but it will be readily understood that my invention is equally applicable to boilers having a pipe, $f$, at each end, in which case each pipe may have a trap near the center, or one trap at the center may answer for both pipes. It is equally immaterial whether the trap is in vertical position, as shown in the drawing, or in a horizontal one, as above described, and whether the partitions are above each other or in the same plane, the result sought to be attained being accomplished either way; for the great object of my invention is to prevent the backflow of the water through the trap and create a continuous stream in one or more directions; and it is further immaterial whether these partial partitions are straight, angular, curved, or of other shape, provided they tend to prevent the backflow of the water by a zigzag or serpentine passage through the trap-chamber.

I have represented and described my device of fixed stops or partial partitions as applied to a trap or chamber above the bottom of the boiler, but it is obvious that the device may be applied below said bottom—as, for instance, in the pipe or pipes under a boiler, in which pipes the water is heated, as above described. In fact, they may be applied in any position which may be most convenient and most effective in regard to the results to be obtained.

Having described my invention, I claim—

1. Fixed open stops or partial partitions $m$, arranged within a chamber either above or below the bottom of a boiler in a way to admit of the continuous free flow of water through said chamber to and within the boiler, and to prevent the back action of such flow of water, essentially as described.

2. The trap $b$, having an external flaring guard, $i$, with inlet-openings, and provided with interior open stops or partial partitions which divide the chamber of the trap into compartments having zigzag outlets, in the manner and for the purpose described.

GEORGE F. STONE.

Witnesses:
GEO. A. HEMMICK,
H. W. LATHROP.